Figure 1:
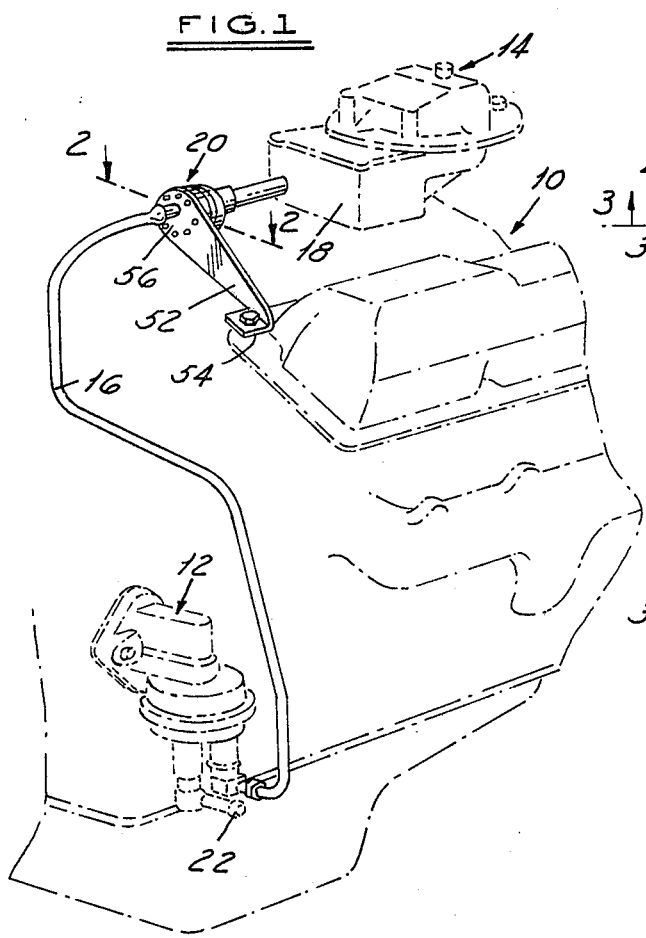

United States Patent [19]

Springer

[11] 3,915,255

[45] Oct. 28, 1975

[54] VEHICLE ROLL-OVER ENGINE FUEL LINE SHUT-OFF VALVE

[75] Inventor: Jerry L. Springer, Livonia, Mich.

[73] Assignee: Ford Motor Company, Dearborn, Mich.

[22] Filed: Dec. 19, 1974

[21] Appl. No.: 534,513

[52] U.S. Cl. .................................. 180/104; 137/38
[51] Int. Cl.² ........................................ B60K 27/08
[58] Field of Search ............... 180/104; 137/38, 43; 123/198 DB

[56] References Cited
UNITED STATES PATENTS

| | | | |
|---|---|---|---|
| 2,258,323 | 10/1941 | Gray | 180/104 |
| 2,619,185 | 11/1952 | Rudisill | 180/104 |
| 2,676,708 | 4/1954 | Risk | 137/38 X |
| 3,807,423 | 4/1974 | Engel | 180/104 X |
| 3,840,036 | 10/1974 | Renk | 180/104 X |

Primary Examiner—David Schonberg
Assistant Examiner—Terrance L. Siemens
Attorney, Agent, or Firm—Robert E. McCollum; Keith L. Zerschling

[57] ABSTRACT

A fuel line for a motor vehicle engine contains a fuel flow shut-off device having a number of valves which upon lateral rollover of the vehicle and engine move to shut off fuel flow through the line, regardless of the direction of rollover.

8 Claims, 5 Drawing Figures

VEHICLE ROLL-OVER ENGINE FUEL LINE SHUT-OFF VALVE

This invention relates in general to a fuel flow shut-off valve. More particularly, it relates to a device that will automatically shut off or block the flow of fuel in an engine fuel line when the motor vehicle rolls over or otherwise attains an attitude in which fuel normally would escape from the system.

Devices are known to prevent the spill of fuel from an engine when a motor vehicle is involved in an accident causing it to turn over or tip sufficient to lose fuel. An example is shown in U.S. Pat. No. 2,619,185, Rudisill, issued Nov. 25, 1952, "Safety Fuel Cut-Off for Vehicles." Rudisill shows a line connecting a fuel tank to an engine carburetor. The line contains a triangularly-shaped extension in which are located three gravity movable valve members. The valve members are conically-shaped to cooperate with tapered portions of the line extensions so that as soon as the vehicle rolls beyond a predetermined angle in either direction, at least one of the valve members will seat to seal off flow through the line.

The above construction requires three separate valves and three separate mating line portions to assure blocking of fuel flow in all attitudes of the line other than upright. This results in an expensive construction.

The invention provides an economical engine fuel flow control device that positively shuts off fuel flow when desired, and yet has a minimum number of valves and a simplified construction. More particularly, the invention consists of a hollow compartmentized housing that is disposed in the fuel line at right angles to the direction of fuel flow and contains a number of valve means that move between alternate positions blocking or unblocking flow through the fuel line as a function of the direction of tilting movement of the housing upon rollover of the vehicle.

It is a primary object of the invention, therefore, to provide a fuel flow control device that is simple in construction, has a minimum of parts, is economical to manufacture, and is reliable in operation.

It is a further object of the invention to provide a fuel flow control device that has a compartmentized housing in which each compartment contains a rollable valve means that moves selectively in one direction or the other upon tilting of the housing in response to rollover of the vehicle to block further flow through a fuel line so long as the housing and vehicle remain other than in the upright position.

It is a still further object of the invention to provide a control device of the type described which includes a round box-like hollow housing extending on end in an upright position essentially at right angles to the direction of fuel flow through the line in which it is inserted, the housing having a separator plate partitioning the housing into a pair of compartments or chambers each with a clover-like or heart-like shape in its normal installed position, the lower centrally-extending portion of each compartment containing a disc valve that is guided by the shape of the housing walls to be rollable selectively as a function of the direction of angular tilting movement of the housing upon rollover of the vehicle, into one or the other of the upper angularly-extending portions of each chamber containing either fuel inlet and outlet ports or communicating with a hole in the separator plate so as to block flow through the line at all positions of the housing other than in the upright position.

Figure 2:
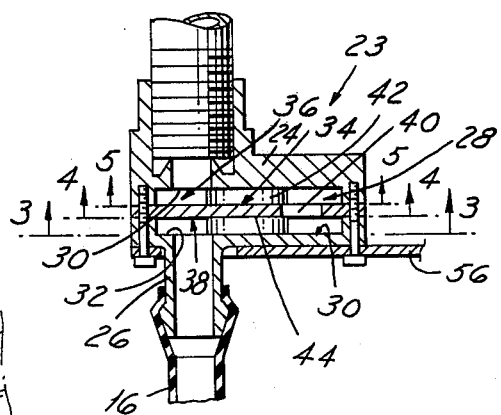
Figure 5:
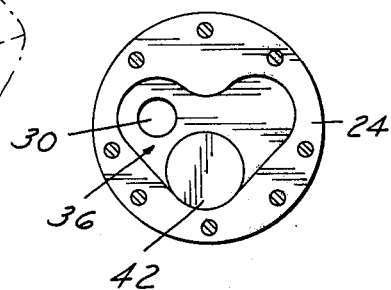
Figure 4:
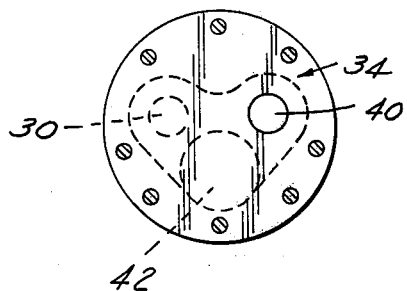
Figure 3:
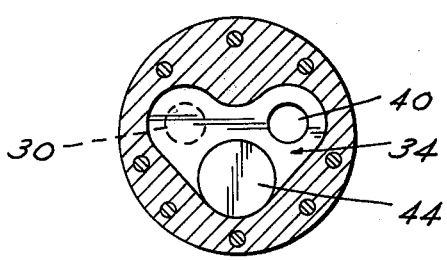

Other object, features and advantages of the invention will become more apparent upon reference to the succeeding detailed description thereof, and to the drawings illustrating the preferred embodiment thereof; wherein, FIG. 1 is a perspective elevational view of an internal combustion engine embodying the invention;

FIG. 2 is an enlarged top sectional view of a detail taken on a plane indicated by and viewed in the direction of the arrows 2—2 of FIG. 1; and, FIGS. 3, 4 and 5 are cross-sectional views taken on planes indicated by and viewed in the direction of the arrows 3—3, 4—4 and 5—5, respectively, of FIG. 2.

FIG. 1 illustrates a portion of a V-type internal combustion engine 10 having a fuel pump 12 and a downdraft type carburetor 14. A fuel supply line 16 connects the fuel pump and the float bowl 18 of the carburetor, and contains the fuel flow shut-off device 20 of the invention. The fuel pump 12 in this case has an inlet fitting 22 that is adapted to be connected to a gasoline tank or fuel reservoir, not shown. As will appear later, it will be clear that the fuel shut-off device may be installed in any fuel or fuel vapor line associated with the engine to minimize fuel spill upon rollover of the vehicle, without departing from the scope of the invention.

As best seen in FIGS. 3–5, device 20 has a round box-like housing 23 that is stood on end in the assembled or upright position. It is made up of two cup-shaped parts 24 and 26, positioned in a face-to-face relationship to form a chamber 28. A fuel port 30, 32 is provided in the side wall of each part 24, 26, the ports being essentially axially aligned with each other and coaxial with the fuel line at that point. The ports each cooperate with housing extensions forming fuel line adapter portions, as shown.

Chamber 28 is partitioned by a separator plate or disc 34 into two compartments 36, 38, the plate having a hole 40 providing communication between the compartments. Each compartment contains a rollable flat disc valve 42, 44 that at times is movable by gravity from an initial position shown in FIGS. 2 through 5 to alternate positions covering or blocking either ports 30, 32 or the separator plate hole 40. In effect, the housing is made up of three parallel plates with side wall separators between to define two fuel chambers communicating with each other through a hole in the central plate.

As best seen in FIGS. 3–5, each of the compartments 36, 38 has a heart-like or clover-like shape in cross-section This provides two upper finger-like or nodular portions 46, 48 that are spaced circumferentially from one another but are interconnected. The two portions 46, 48 extend angularly with respect to each other and to a lower third finger-like or nodular portion 50 that depends centrally therefrom.

The ports 30 and 32 are located in the left-hand (as seen in FIGS. 3–5) upper portion 46 of the chamber, while the separator plate hole 40 is located in the right-hand upper portion 48. Each of the disc valves 40, 42 normally is positioned by gravity at the apex or lower portion 50 so long as the housing remains in the attitude shown. The dimensions of each finger-like or nodular portions are slightly greater than the thickness and diameter respectively of the discs 40, 42 so that the flatness and shape of the housing walls and separator plate serve to guide the rolling movement of the discs.

Insofar as attitude is concerned, FIG. 1 shows the installation of device 20 to the engine. A right angled bracket 52 is bolted at one end 54 on the valve train cover, the opposite end 56 being fixed to the housing portion 26 (FIG. 2). When installed, the device is located or positioned at the attitude indicated in FIGS. 1 and 3, which is called the upright position.

In operation, so long as the motor vehicle remains in a normal essentially upright position, the discs 42 and 44 remain in the lower positions shown in FIGS. 2-5, permitting the free flow of fuel through the ports 30, 32 and hole 40. However, as soon as the vehicle tilts a predetermined amount laterally about a longitudinal axis, i.e., an axis parallel to the axis of the fuel flow through ports 30 and 32, by an angle sufficient to tilt the housing 23 clockwise, for example, from the FIG. 3 position, then both discs 42, 44 will roll by gravity to the positions covering the separator plate hole 40. This will prevent further flow of fuel through line 16 into the carburetor and thereby minimize spillage. Depending upon the direction of fuel flow, the pressure of fuel against the side face or surface of one or the other of the discs 42, 44 will then aid in sealing that disc against the hole 40. Continued clockwise movement of the housing by continued rollover of the vehicle, will maintain the discs 42, 44 in the positions blocking fuel flow through hole 40 until the vehicle makes essentially a complete turn of 360° returning it and the housing again to the position shown in FIGS. 3-5. At this point, the discs 42, 44 will have rolled back by gravity into the lower nodular portion 50 to unblock the hole 40.

A similar action occurs should the vehicle roll over or back in the opposite or counterclockwise direction. In this latter case, the discs 42, 44 would move by gravity to cover the fuel ports 30 and 32, and the pressure of fuel against one or the other of the discs will seal one of the discs against the associated fuel port. It will be seen, therefore, that regardless of the direction of tilting movement of the vehicle about a longitudinal axis, the discs will move into one or the other of the nodular portions 46, 48 to block flow either through the ports 30 and 32, or hole 40.

It will be seen, therefore, that the housing of device 20 in effect rotates about a longitudinal axis through the housing, and by the housing extending on end and essentially laterally at right angles to the direction of fuel flow, the discs 42, 44 will together roll selectively in opposite directions as a function of the direction of tilting movement to cover the fuel ports or separator plate hole during all attitudes of the housing other than the normal upright position.

While the invention has been shown and described in its preferred embodiments, it will be clear to those skilled in the arts to which it pertains that many changes and modifications may be made thereto without departing from the scope of the invention. It will be clear, for example, that the circumferential or angular spacing between the upper nodular or finger-like portions 46, 48 and lower portion 50 as seen in FIGS. 3-5, can be varied as desired to vary the amount of tilt permitted before fuel flow shut off is attained, to avoid shut off during certain vehicle cornering movements, for instance.

I claim:

1. A fuel flow control device for use in connection with a motor vehicle having a fuel containing line connecting a fuel source to a portion of the engine induction system, the device comprising a hollow housing secured in the line in an initial upright position connecting two parts of the line and extending laterally of and essentially at right angles to the direction of fuel flow through the line at that point, the housing having a fuel inlet port essentially axially aligned with a fuel outlet port in the direction of fuel flow, the housing defining a chamber connecting the ports and containing a separator plate dividing the chamber into a pair of compartments, and blocking communication of fuel between the ports, the plate having an opening at a point remote from the axis of the ports for communicating fuel from one port to the other through the plate, and a valve in each of the compartments movable from a normal initial position permitting free communication between the ports to other positions blocking flow through at least one of the ports or the plate opening, the valves being movable by gravity in response to a predetermined tilting angular movement of the housing in either direction from the upright position upon a corresponding predetermined tilting of the engine about its longitudinal axis.

2. A control device as in claim 1, each of the compartments having a clover-like shape with a plurality of interconnected nodes extending at angles to each other, the ports being located one in a first one of the nodes of each compartment, the separator plate opening communicating with a second node of the remaining plurality of nodes in each compartment, and the valves each being located in a further one of the plurality of nodes and movable therefrom selectively into the first and second nodes.

3. A control device as in claim 2, the valve means comprising a number of valves greater than one and one less than the number of nodes.

4. A control device as in claim 3, the valves comprising a disc rollable separately across one of the ports at times and across the separator plate opening at other times, as a function of the direction of tilting movement of the housing to maintain fuel flow blocked at all times when the housing is in a predetermined position other than the upright position.

5. A control device as in claim 1, the housing compartments each having a heart-like shape with two angled upstanding nodular portions joined to a depending central portion with each portion spaced angularly from each other, the ports being located in corresponding parts of the first of the upstanding portions, each of the depending nodes containing a valve rollable by gravity towards the first upstanding nodes to block flow through the ports upon predetermined tilting movement of the housing in one direction from the upright position, the valves being rollable by gravity towards the second upstanding portions to block flow through the separator plate opening upon predetermined tilting movement of the housing in the opposite direction from the upright position.

6. A control device as in claim 5, the housing being flat and the valves consisting of flat discs.

7. A control device as in claim 1, the housing consisting of a pair of flat bottomed cup-shaped members in face-to-face relationship with a separator disc therebetween to define a pair of separated chambers, each chamber having a heart-like shape when in the installed upright position with a pair of upper angled finger-like portions spaced from each other and joined to a lower centrally located portion, the ports being located one in each of the corresponding upper portions, the separator plate having a hole opening into each of the other upper angled corresponding portions, each of the lower portions containing a flat disc valve selectively rollable alternately towards the ports or hole to block at least one or the other as a function of the direction of tilting movement of the housing and in response to a predetermined angular tilting movement of the housing from the upright position.

8. A control device as in claim 1, the pressure of fuel acting against at least one of the valves when the valves are in a position blocking flow through the ports or hole aiding in sealing the valve against the ports or hole.

* * * * *